United States Patent
Ge et al.

(10) Patent No.: US 9,240,711 B2
(45) Date of Patent: Jan. 19, 2016

(54) CONSTANT CURRENT CONTROL CIRCUIT WITH PFC FUNCTION AND ITS PFC CIRCUIT

(75) Inventors: Liang'an Ge, Hangzhou (CN); Xiaoli Yao, Hangzhou (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 0 days.

(21) Appl. No.: 14/346,086

(22) PCT Filed: Aug. 6, 2012

(86) PCT No.: PCT/CN2012/079719
§ 371 (c)(1),
(2), (4) Date: Mar. 20, 2014

(87) PCT Pub. No.: WO2013/044685
PCT Pub. Date: Apr. 4, 2013

(65) Prior Publication Data
US 2014/0225527 A1      Aug. 14, 2014

(30) Foreign Application Priority Data

Sep. 26, 2011   (CN) .......................... 2011 1 0289044

(51) Int. Cl.
*H02M 1/42*      (2007.01)
*H02M 7/217*     (2006.01)
(Continued)

(52) U.S. Cl.
CPC .......... *H02M 1/4208* (2013.01); *H02M 7/2176* (2013.01); *H05B 33/0815* (2013.01); *H05B 33/0848* (2013.01); *H02M 3/07* (2013.01); *Y02B 20/347* (2013.01); *Y02B 70/126* (2013.01)

(58) Field of Classification Search
CPC .......... H05B 33/0815; H05B 33/0848; H02M 1/4208; H02M 7/2176
USPC ................................................... 315/247, 291
See application file for complete search history.

(56) References Cited

U.S. PATENT DOCUMENTS

| 5,019,952 A | 5/1991 | Smolenski et al. |
| 6,091,612 A | 7/2000 | Blankenship |

(Continued)

FOREIGN PATENT DOCUMENTS

| CN | 101009468 A | 8/2007 |
| CN | 101883461 A | 11/2010 |

(Continued)

OTHER PUBLICATIONS

Ian Poole, Opeartion Ampliefier Comparator Circuit, http://www.radio-electronics.com/info/circuits/opamp_comparator/op_amp_comparator.php, Figures.*

(Continued)

*Primary Examiner* — Douglas W Owens
*Assistant Examiner* — Raymond R Chai
(74) *Attorney, Agent, or Firm* — Harness, Dickey & Pierce, P.L.C.

(57) ABSTRACT

A constant current control circuit with PFC function and its PFC circuit are provided. The PFC circuit comprises a valley-filled PFC circuit and a harmonic compensation circuit, whose output signal is supplied to the current control circuit. By adding the harmonic compensation circuit to the PFC circuit, the distortion of input current is decreased and the power factor is enhanced. Moreover, the whole circuit is simplified and its cost is reduced.

8 Claims, 7 Drawing Sheets

(51) Int. Cl.
*H05B 33/08* (2006.01)
*H02M 3/07* (2006.01)

(56) References Cited

U.S. PATENT DOCUMENTS

| | | | |
|---|---|---|---|
| 6,175,218 | B1 | 1/2001 | Choi et al. |
| 2008/0197786 | A1 | 8/2008 | Schaible et al. |
| 2008/0316781 | A1* | 12/2008 | Liu ................................. 363/80 |
| 2011/0089868 | A1* | 4/2011 | Sauerlaender ................ 315/310 |

FOREIGN PATENT DOCUMENTS

| CN | 201708974 U | 1/2011 |
|---|---|---|
| CN | 201742599 U | 2/2011 |
| CN | 201789658 U | 4/2011 |

OTHER PUBLICATIONS

International Search Report (in Chinese with English translation) and Written Opinion (in Chinese) for PCT/CN2012/079719, mailed Nov. 15, 2012; ISA/CN.

First Chinese Office Action regarding Application No. 201110289044.7, dated Jul. 2, 2014. Translation provided by Unitalen Attorneys at Law.

\* cited by examiner

CONSTANT CURRENT CONTROL CIRCUIT WITH PFC FUNCTION AND ITS PFC CIRCUIT

CROSS-REFERENCE TO RELATED APPLICATIONS

The present application is the 371 national phase of International Application No. PCT/CN2012/079719, titled "CONSTANT CURRENT CONTROL CIRCUIT WITH PFC FUNCTION AND ITS PFC CIRCUIT", filed on Aug. 6, 2012, which claims the priority to Chinese Patent Application No. 201110289044.7, entitled "CONSTANT CURRENT CONTROL CIRCUIT WITH PFC FUNCTION AND ITS PFC CIRCUIT", filed on Sep. 26, 2011 with the Chinese State Intellectual Property Office, the contents of which are incorporated herein by reference in their entirety.

FIELD

The present disclosure relates to a constant current control circuit and a power factor correction circuit thereof and in particular to a constant current control circuit with power factor correction function and a power factor correction circuit thereof.

BACKGROUND

FIG. 1 is a schematic circuit diagram of a conventional constant-current control circuit. Referring to FIG. 1, the control principle of the constant-current control circuit includes: a current in a switching tube S1 is sampled by a first sampling resistor Rs, and then the sampled current is input to a Cs terminal of a control chip IC. In the chip IC, the sampled current signal input from the Cs terminal is compared with a reference signal, and a driving signal is output via Dr to a control terminal of the switching tube S1 according to the comparison result; therefore, by an adjusting of the control chip IC, a current peak in the switching tube may be equal to a current value configured by the reference signal and the first sampling resistor Rs, hence the current peak in the switching tube may be controlled. Due to the conversion of the main circuit, the peak of the current output from the main circuit may be controlled indirectly; hence a constant current control may be realized.

For the constant current control circuit in which the output current is kept constant by controlling the peak current of the main switching tube, the output of the constant current control circuit is not feedback, hence the circuit has the characteristics of fast dynamic response, simple structure and low cost and is widely applied in low-power constant current circuit.

However, in order to reduce the harm caused by harmonic and reactive power, in certain application scenarios, a higher power factor (PF) is often required. In this case, the power factor correction circuit needs to be added in the constant current control circuit, where a valley-fill power factor correction (PFC) circuit is adopted most commonly.

FIG. 2 is a schematic structure diagram of a conventional valley-fill PFC circuit. The principle of the valley-fill PFC circuit may be summarized as: the peak portion of the input Sine voltage charges via D3 the capacitors C1 and C2 which are connected in series; in a case that the input Sine voltage is lower than the peak voltage, the capacitors C1 and C2 may be discharged in parallel via D1 and D2. This traditional valley-fill PFC circuit may correct the power factor to some extent, but the PF value is often low due to the distorted input current; hence in certain scenarios where a higher PF value is required, a simple valley-fill PFC circuit may not meet the requirement.

In summary, the conventional constant current control circuit and the conventional valley-fill PFC circuit thereof has the problem of low PF value due to the distorted input current. Therefore, an improved technical solution is desirable to solve this problem.

SUMMARY

In view that the conventional constant current control circuit and the conventional valley-fill PFC circuit thereof has the problem of low PF value due to the distorted input current, it is to provide a constant current control circuit and a power factor correction circuit thereof, in which a harmonic compensating circuit is added to the power factor correction circuit, the input current may be improved, the distortion may be reduced, and the power factor of the circuit may be enhanced as a result; meanwhile, the circuit is simple, and the cost is low.

For the above mentioned purpose and other purpose, a power factor correction circuit applicable in a constant-current control circuit is provided. The constant-current control circuit includes at least a current control circuit and a driving control circuit, where an output of the current control circuit is connected to the driving control circuit, and an output of the driving control circuit is connected to a control terminal of a switching tube. The power factor correction circuit includes a valley-fill PFC power factor correction circuit and a harmonic compensating circuit, where an output signal of the harmonic compensating circuit is output to the current control circuit.

Furthermore, the output signal of the harmonic compensating circuit is a periodic signal with a period same as that of an input current of the power factor correction circuit, each period includes a first time duration in which the output signal is a level signal and a second time duration in which the output signal increases from the level signal and then decreases until returning to the level signal or the output signal decreases from the level signal and then increases until returning to the level signal, where the first time duration is a time duration in which the input current is 0, and the second time duration is a time duration in which the input current is not 0.

Furthermore, in a case that the output signal increases and then decreases, an input signal of the harmonic compensating circuit is an output voltage of the valley-fill PFC circuit.

Furthermore, in a case that the current control circuit includes a reference signal circuit, a comparing control circuit and a current sampling circuit, the harmonic compensating circuit is adapted to sample the output voltage of the valley-fill PFC circuit, and to input the sampled signal as the output signal of the harmonic compensating circuit to the reference signal circuit in the current control circuit, such that the reference signal input to the comparing control circuit varies with the output signal of the harmonic compensating circuit, where the comparing control circuit is adapted to output a control signal to the driving control circuit after comparing the reference signal with a sample signal output by the current sampling circuit, and the driving control circuit is adapted to control the switching tube such that a current of the switching tube varies with the output signal of the harmonic compensating circuit.

Furthermore, the reference signal circuit includes a reference voltage, a first resistor and a second resistor, where an output terminal of the harmonic compensating circuit is connected to a non-inverting input terminal of the comparing control circuit via the second resistor, the reference voltage is connected to the non-inverting input terminal of the comparing control circuit via the first resistor, where the current sampling circuit includes a first sampling resistor, one terminal of the first sampling resistor is grounded, and another terminal of the first sampling resistor is connected to the switching tube of a main circuit and is further connected to an inverting input terminal of the comparing control circuit, where an output terminal of the comparing control circuit is connected to the driving control circuit.

Furthermore, the harmonic compensating circuit includes a fourth resistor and a fifth resistor which are connected in series and are further connected to an output terminal of the valley-fill PFC circuit, and an intermediate node between the fourth resistor and the fifth resistor is connected to the second resistor.

Furthermore, in a case that the output signal decreases and then increases, the input signal of the harmonic compensating circuit is a driving signal output by the driving control circuit.

Furthermore, in a case that the current control circuit includes a reference signal circuit, a comparing control circuit and a current sample circuit, the harmonic compensating circuit is adapted to filter the input driving signal, and to output the filtered signal as the output signal to the current sampling circuit in the current control circuit, such that a sample signal input to the comparing control circuit varies with the output signal of the harmonic compensating circuit, where the comparing control circuit is adapted to output a control signal to the driving control circuit after comparing the sample signal and a reference signal which is output by the reference signal circuit, and the driving control circuit is adapted to control the switching tube such that a current of the switching tube varies with the output signal of the harmonic compensating circuit.

Furthermore, the reference signal circuit includes a reference voltage connected to a non-inverting input terminal of the comparing control circuit, where the current sampling circuit includes a first sampling resistor and a third resistor, where one terminal of the first sampling resistor is grounded, and another terminal of the first sampling resistor is connected to the switching tube of a main circuit and is further connected to an inverting input terminal of the comparing control circuit via the third resistor, and an output terminal of the harmonic compensating circuit is connected to the inverting input terminal of the comparing control circuit; where an output terminal of the comparing control circuit is connected to the driving control circuit, and the comparing control circuit outputs the control signal to the driving control circuit after comparing the reference signal with a current sample signal.

Furthermore, the harmonic compensating circuit includes a sixth resistor, a seventh resistor and a third capacitor, where one terminal of the sixth resistor is connected to an output terminal of the driving control circuit, and another terminal of the sixth resistor is grounded via the third capacitor, where an intermediate node between the sixth resistor and the third capacitor is connected to the inverting input terminal of the comparing control circuit via the seventh resistor.

Furthermore, the harmonic compensating circuit further includes a fourth capacitor, where the intermediate node between the sixth resistor and the third capacitor is connected to the inverting input terminal of the comparing control circuit via the seventh resistor and the fourth capacitor which are connected in series, and the input signal undergoes direct-current blocking before being output to the current sample circuit.

Furthermore, in a case that the output signal decreases and then increases, an input signal of the harmonic compensating circuit is a switching tube current sample signal of the switching tube.

Furthermore, in a case that the current control circuit includes a reference signal circuit, a comparing control circuit and a current sampling circuit, the harmonic compensating circuit is adapted to filter the switching tube current sample signal, and to output the filtered signal as an output signal to the current sampling circuit in the current control circuit, such that a sample signal input to the comparing control circuit varies with the output signal of the harmonic compensating circuit, where the comparing control circuit is adapted to output a control signal to the driving control circuit after comparing the sample signal with a reference signal output by the reference signal circuit, and the driving control circuit is adapted to control the switching tube such that a current of the switching tube varies with the output signal of the harmonic compensating circuit.

Furthermore, in a case that the current control circuit includes a reference signal circuit, a comparing control circuit and a current sampling circuit, the harmonic compensating circuit is adapted to filter the switching tube current sample signal, process the filtered signal by direct-current blocking and output the processed signal to the current sampling circuit in the current control circuit, such that a sample signal output to the comparing control circuit varies with the output signal of the harmonic compensating circuit, where the comparing control circuit is adapted to output a control signal to the driving control circuit after comparing the sample signal with a reference signal output by the reference signal circuit, and the driving control circuit is adapted to control the switching tube such that a current of the switching tube varies with the output signal of the harmonic compensating circuit.

For the above mentioned purpose and other purpose, a constant-current control circuit with power factor correction function is further provided in this disclosure, where the constant-current control circuit with power factor correction function is adapted to drive a LED load, where the constant-current control circuit includes a main circuit, a rectifying circuit, a current control circuit and a driving control circuit, the current control circuit is connected to a switching tube of the main circuit, the current control circuit includes a reference signal circuit, a current sampling circuit and a comparing control circuit, the driving control circuit is connected to a control terminal of the switching tube, and the constant-current control circuit further includes the power factor correction circuit as described above.

Compared with conventional technologies, for the constant current control circuit and a power factor correction circuit thereof provided in this disclosure, a harmonic compensating circuit is added to the power factor correction circuit, whereby the input current may be improved, the distortion degree may be reduced, and the power factor of the circuit may be enhanced as a result; meanwhile, the circuit is simple, and the cost is low.

DETAILED DESCRIPTION

The technical solutions according to the embodiments of the present application will be described in more details in conjunction with examples and drawings, and those skilled in the art may easily understand these and other advantages and effects of the disclosure from the contents of the disclosure. The disclosure may be practiced or implemented by other embodiments and the details in the disclosure may be modified or changed based on different aspects and applications without departing from the spirit of the disclosure.

Figure 1:
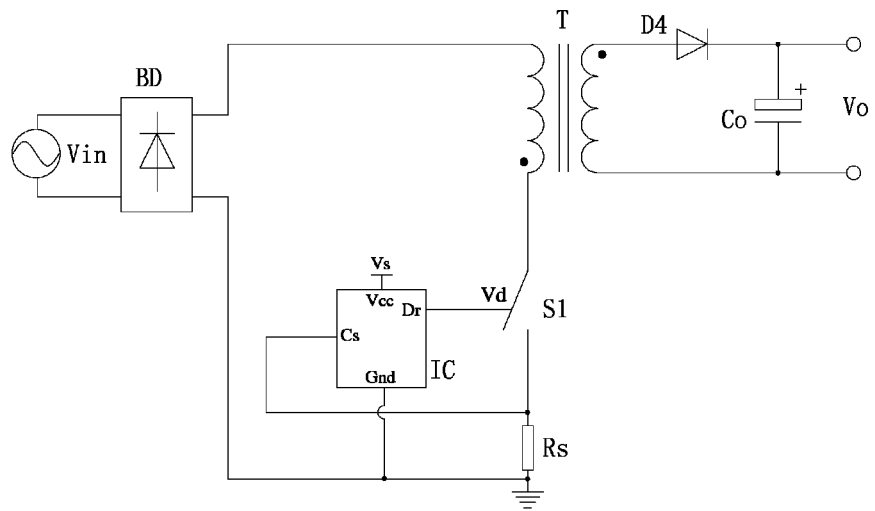
FIG. 1 is a schematic circuit diagram of a conventional constant-current control circuit.
Figure 2:
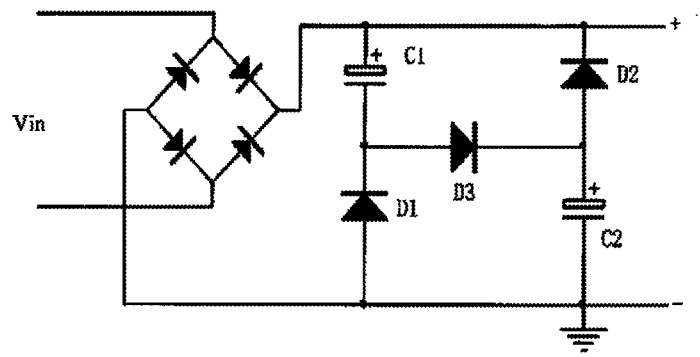
FIG. 2 is a schematic structure diagram of a conventional valley-fill PFC circuit.
Figure 3:
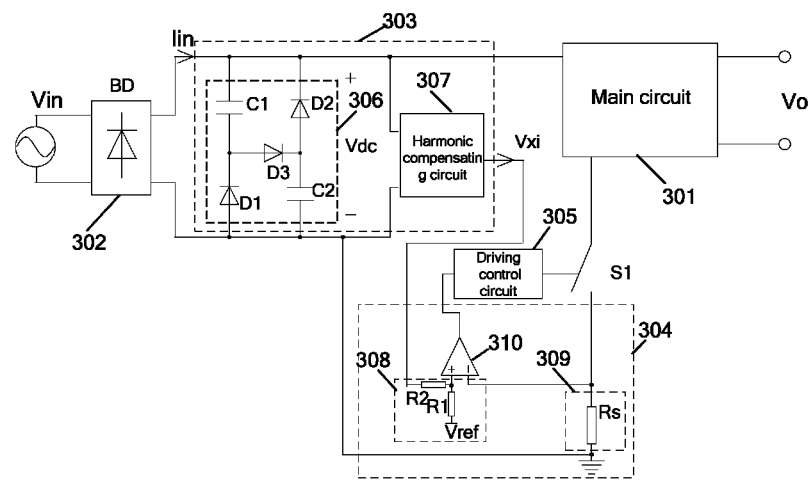
FIG. 3 is a schematic circuit structure diagram of a constant current control circuit with power factor correction function provided according to a first preferable embodiment of the disclosure.

FIG. 3 is a schematic circuit structure diagram of a constant current control circuit with power factor correction function provided according to a first preferable embodiment of the disclosure. As shown in FIG. 3, a constant current control circuit with power factor correction function as provided in the disclosure includes: a main circuit 301, a rectifying circuit 302, a power factor correction circuit 303, a current control circuit 304 and a driving control circuit 305.

The rectifying circuit 302, which is connected to an AC (alternating current) power supply Vin, is adapted to rectify the AC power supply. In one preferable embodiment of the disclosure, the rectifying circuit 302 is a rectifier bridge. The power factor correction circuit 303 includes at least a valley-fill PFC circuit 306 and a harmonic compensating circuit 307. The valley-fill PFC circuit 306, which is connected to an output terminal of the rectifying circuit 302, includes capacitors C1 and C2 and diodes D1, D2 and D3. The structure of the valley-fill PFC circuit 306 is similar to the conventional valley-fill PFC circuit and detailed description thereof is omitted herein. An input signal of the harmonic compensating circuit 307 is an output voltage of the valley-fill PFC circuit 306, i.e., an input voltage of the valley-fill PFC circuit 306 and an output voltage Vdc of the rectifying circuit 302 (rectifier bridge). The harmonic compensating circuit 307 is adapted to convert the input signal into an output signal Vxi and output the Vxi to the current control circuit 304. The current control circuit 304 includes a reference signal circuit 308, a current sampling circuit 309 and a comparing control circuit 310. The reference signal circuit 308, which is connected to a non-inverting input terminal of the comparing control circuit 310, is adapted to generate a reference signal. The current sampling circuit 309, which is connected to a switching tube S1 in the main circuit 301, is adapted to sample the current in the switching tube S1 and output the current sample signal to an inverting input terminal of the comparing control circuit 310. After comparing the reference signal with the current sample signal, the comparing control circuit 310 outputs a control signal to the driving control circuit 305. The driving control circuit 305 outputs a driving signal to drive the switching tube S1 according to the control signal.

In the first preferable embodiment of the disclosure, an input signal of the harmonic compensating circuit 307 is an output voltage of the valley-fill PFC circuit 306, i.e., an input voltage of the valley-fill PFC circuit 306 and an output voltage Vdc of the rectifier bridge (the rectifying circuit 302). The period of the voltage Vdc is half the period of the AC power supply Vin, and the period of the input current Iin of the power factor correction circuit is also half the period of the AC power supply Vin. The harmonic compensating circuit 307 is mainly adapted to sample the input signal Vdc, and the period of the sample signal is as same as the period of the voltage Vdc, hence the output signal of the harmonic compensating circuit is a periodic signal with a period same as that of the input current of the power factor correction circuit.

The output signal of the harmonic compensating circuit 307 is input to the reference signal circuit 308 of the current control circuit 304, hence the reference signal input to the comparing control circuit 310 may vary with the change of the output signal of the harmonic compensating circuit 307, and the current of the switching tube S1 may also vary with the change of the output signal of the harmonic compensating circuit 307 as a result, therefore the change rate of the input current may be improved and the peak the input current may be lowered, and then the power factor of the entire circuit may be enhanced. In the first preferable embodiment of the disclosure, the reference signal circuit 308 includes a reference voltage Vref, a first resistor R1 and a second resistor R2. The output terminal of the harmonic compensating circuit 307 is connected to the non-inverting input terminal of the comparing control circuit 310 via the second resistor R2, and the reference voltage Vref is connected to the non-inverting input terminal via the first resistor R1, hence the reference signal input to the non-inverting input terminal of the comparing control circuit 310 is a superposed signal of the reference voltage Vref and the output signal Vxi of the harmonic compensating circuit 307 via the first resistor R1 and the second resistor R2 respectively. The current sampling circuit 309 includes a first sampling resistor Rs, and one terminal of the Rs is grounded, and another terminal of the Rs is connected to the switching tube S1 of the main circuit 301 and is connected to the inverting input terminal of the comparing control circuit 310, hence the current sample signal may be the signal on the first sampling resistor Rs. The output terminal of the comparing control circuit 310 is connected to the driving control circuit 305; after comparing the reference signal with the current sample signal, the comparing control circuit 310 may output the control signal to the driving control circuit 305. The comparing control circuit 310 includes a UI, where the UI may be an integrated operational amplifier or a comparator.

The constant-current control circuit in this disclosure has the function of power factor correction and may output a constant current to drive LED load.

Figure 4:
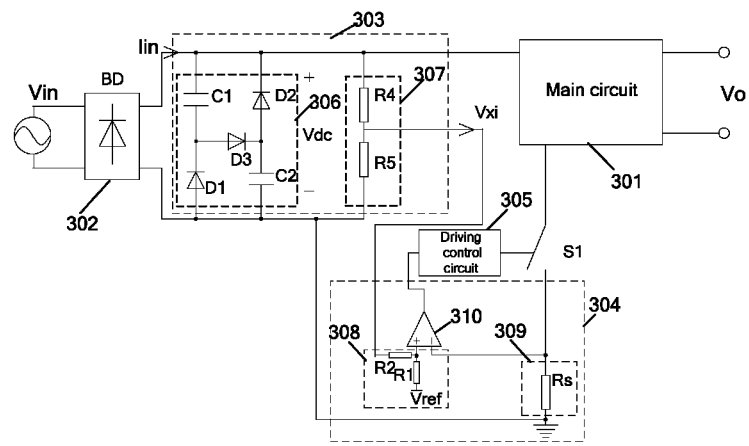
FIG. 4 is a detailed circuit diagram of an implementation of the first preferable embodiment of the disclosure.

FIG. 4 is a detailed circuit diagram of an implementation of the first preferable embodiment of the disclosure. Preferably, the harmonic compensating circuit 307 includes a R4 and a R5 which are connected in series and are connected to the output terminal of the rectifying circuit 302. The intermediate node between the resistor R4 and the resistor R5 is connected to the second resistor R2 of the reference signal circuit 308. In the first preferable embodiment, the harmonic compensating circuit 307 samples the input voltage Vdc via the resistors R4 and R5 and outputs the sampled signal to the reference signal circuit 308 of the current control circuit as the output signal Vxi.

Figure 5:
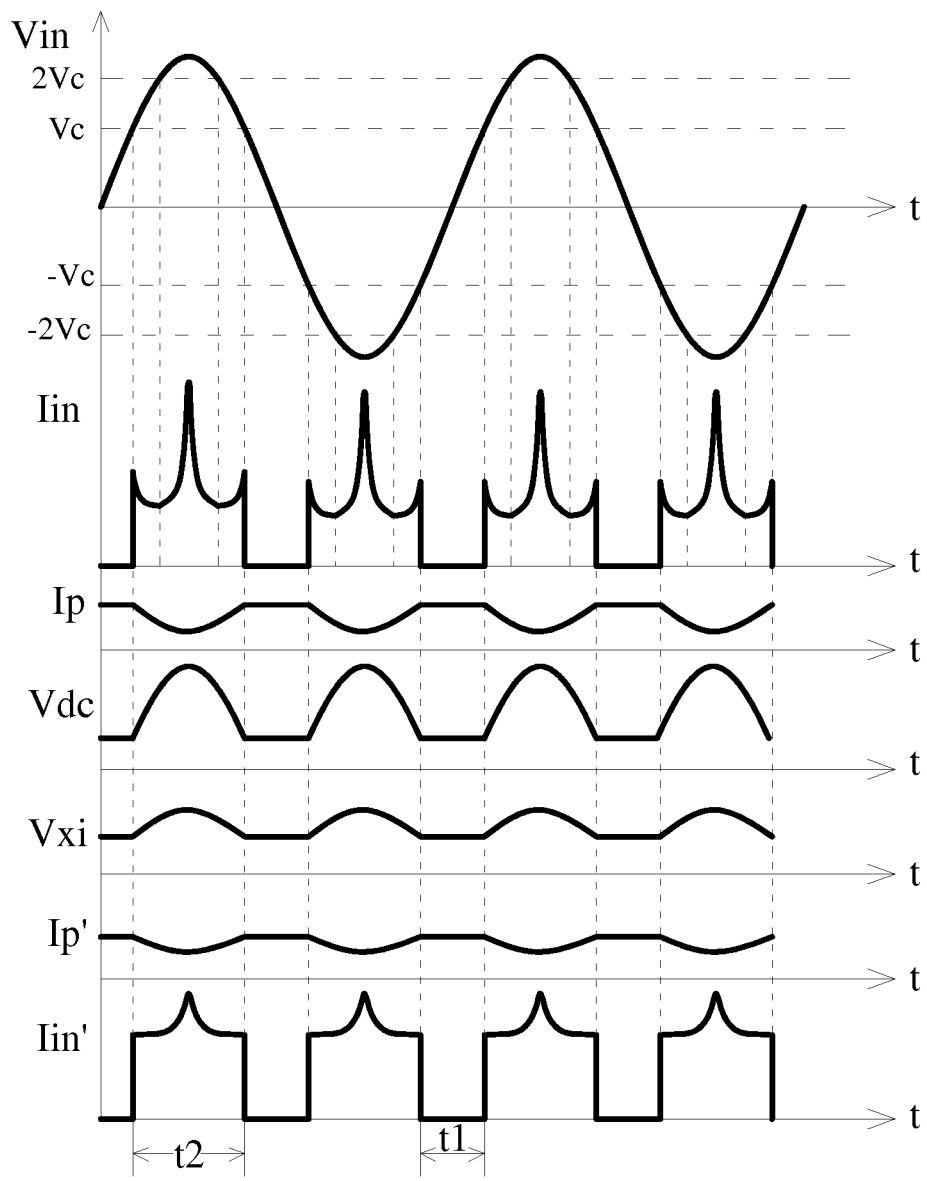
FIG. 5 is an oscillogram showing the working status of respective signals in the first preferable embodiment of the disclosure.

FIG. 5 is an oscillogram showing the working status of respective signals in the first preferable embodiment of the disclosure. The operational principle in the first preferable embodiment of the disclosure may be further illustrated in conjunction with FIG. 3, FIG. 4 and FIG. 5 in the following. The output voltage Vdc of the rectifier bridge (the rectifying circuit 302) is determined as follows: if the input voltage Vin is less than a capacitor voltage Vc, the Vdc is equal to the capacitor voltage Vc (the Vc may be approximate to a level signal in this phase), and the capacitors C1 and C2 may discharge to the subsequent stage of the circuit via the diodes D1 and D2. If the input voltage Vin is greater than the capacitor voltage Vc, the Vdc is equal to the input voltage Vin (in this phase, the Vin is a signal which increases first and then decreases). In this phase, if the input voltage Vin is less than 2Vc, the input voltage Vin supplies voltage for the backward stage circuit; since the load is fixed and the input voltage increases, the input current Iin may decrease. If the input voltage Vin is greater than 2Vc, the input voltage Vin may charge for the capacitors C1 and C2; since the charging current increases rapidly, the input current Iin may increase accordingly. The waveform of the input current Iin is shown in FIG. 5.

An average current Ip of the switching tube S1 is part of the input current Iin. Due to the harmonic compensating circuit 307, the average current of the switching tube changes from Ip to Ip' in a time duration t2. Accordingly, the input current Iin may vary with the change of the current of the switching tube and change from Iin to Iin'. Therefore, the power factor may be improved.

It can be seen from the above analysis, each period of the input voltage Vdc includes a first time duration and a second time duration. In the first time duration, the output signal is a level signal; in the second time duration, the output signal increases first from the level signal and then decreases until returning to the level signal. Correspondingly, in the first time duration, the input current is 0; in the second time duration, the input current is not 0. As shown in FIG. 3 and FIG. 4, the harmonic compensating circuit 307 samples the input voltage Vdc, where the change of the sampled signal accords with the change of the input voltage Vdc, and the sampled signal may be output to the reference signal circuit in the current control circuit as the output signal Vxi, hence the reference signal may vary with the change of the Vxi. In a case that the reference signal increases first and then decreases in the second time duration, the current peak of the switching tube is increased as compared with the case that the harmonic compensating circuit is not added, and the increased value also increases first and then decreases, hence the average current of the switching tube may also increase in the second time duration, and the difference between the average current of the switching tube in this case and the average current in the case that the harmonic compensating circuit is not added may also increase first and then decrease in the second time duration. The waveform of the average current Ip' of the switching tube is shown in FIG. 5.

In the first time duration t1, the output signal Vxi of the harmonic compensating circuit 307 is a level signal; in the second time duration t2, the Vxi increases first from the level signal and then decreases until returning to the level signal in the time duration t1.

As shown in FIG. 5, the average current of the switching tube S1 is Ip in a case that the harmonic compensating circuit is not added, and the average current of the switching tube S1 is Ip' in a case that the harmonic compensating circuit is added. That is to say, in the time duration t2, the value of the average current Ip' of the switching tube S1 in the case that the harmonic compensating circuit is added is greater than the value of the average current Ip of the switching tube S1 in the case that the harmonic compensating circuit is not added, and the input current may change from Iin to Iin' due to the change of the current of the switching tube S1. That is because, in a case that the harmonic compensating circuit is added, the current Ip' of the switching tube S1 increases in the time duration t2, and then the input current Iin' may increase due to the increase of Ip; hence the Iin' is greater than the Iin in the time duration t2, and the recess in the waveform of Iin' is smaller than that of Iin, that is to say, the distortion of the output current is changed.

Figure 6:
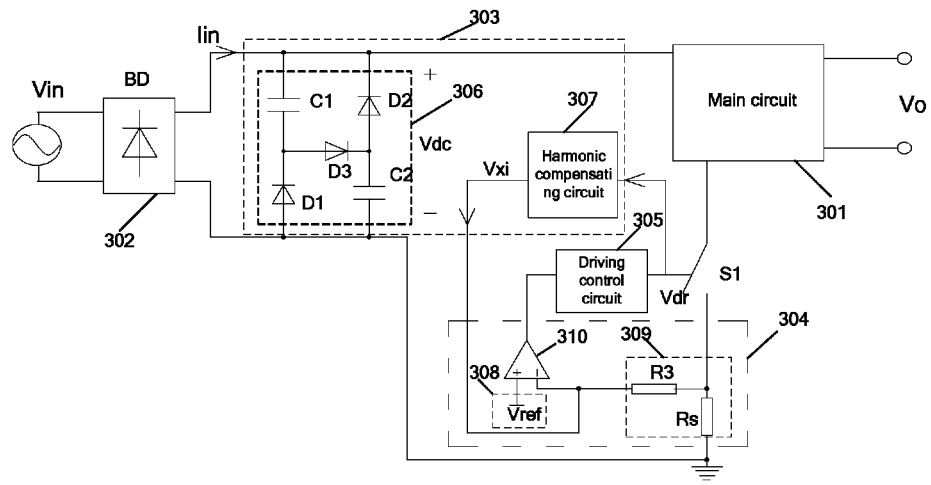
FIG. 6 is a schematic circuit structure diagram of a constant current control circuit with power factor correction function provided according to a second preferable embodiment of the disclosure.

FIG. 6 is a schematic circuit structure diagram of a constant current control circuit with power factor correction function provided according to a second preferable embodiment of the disclosure. This embodiment is different from the first preferable embodiment in that an input terminal of a harmonic compensating circuit 307 is connected to a driving control circuit 305, and an output terminal of the harmonic compensating circuit 307 is connected to a current sampling circuit 309 in a current control circuit 304. In the second preferable embodiment of the disclosure, the input signal of the harmonic compensating circuit 307 is the output signal of the driving control circuit 305, i.e., a driving signal Vdr output by the driving control circuit 305. The harmonic compensating circuit 307 filters the input driving signal Vdr and then outputs the filtered signal as an output signal Vxi to the current sampling circuit 309 of the current control circuit 304.

After the driving signal Vdr output by the driving control circuit 305 is filtered, the filtered signal is a periodic signal with a period the same as that of the input current of the power factor correction circuit, and each period includes a first time duration and a second time duration. In the first time duration, the output signal is a level signal; in the second time duration, the output signal decreases first from the level signal and then increases until returning to the level signal. In the first time duration, the input current is 0; in the second time duration, the input current is not 0.

In the second preferable embodiment, a reference signal circuit 308 includes a reference voltage Vref which is connected to a non-inverting input terminal of a comparing control circuit 310. The current sampling circuit 309 includes a first sampling resistor Rs and a third resistor R3, where one terminal of the first sampling resistor Rs is grounded, and another terminal of the first sampling resistor Rs is connected to a switching tube S1 of a main circuit 301 and further connected to an inverting input terminal of the comparing control circuit 310 via the third resistor R3. The output terminal of the harmonic compensating circuit 307 is connected to the inverting input terminal of the comparing control circuit 310, and the current sample signal output by the current sampling circuit 309 is a superposed signal of an output signal Vxi of the harmonic compensating circuit 307 and the signal of the first sampling resistor via the third resistor R3, hence the current of the first sampling resistor Rs may vary with the change of the output signal Vxi of the harmonic compensating circuit 307, and the current of the switching tube S1 may change as a result, thereby reducing the distortion of the input signal and improving the power factor of the entire circuit. The output terminal of the comparing control circuit 310 is connected to the driving control circuit 305; hence after comparing the reference signal with the current sample signal, the comparing control circuit 310 may output a control signal to the driving control circuit 305. The comparing control circuit 310 may be an integrated operational amplifier or a comparator.

Figure 7:
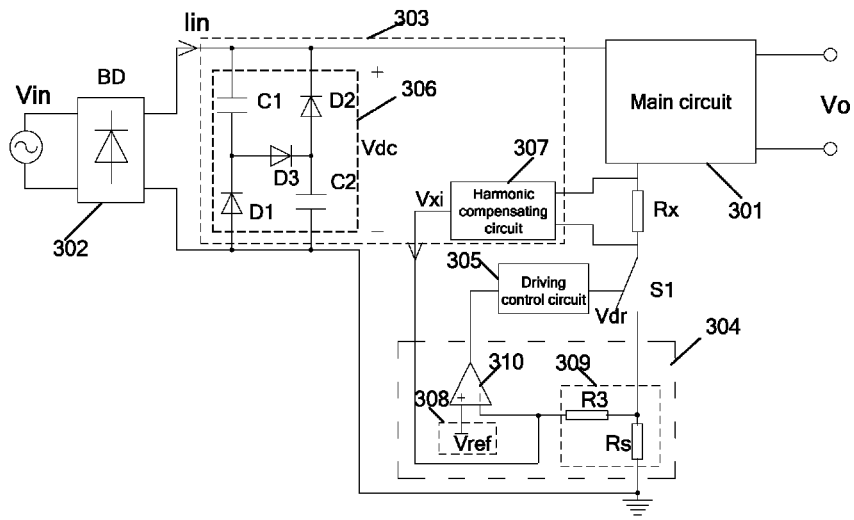
FIG. 7 is a schematic circuit structure diagram of a constant current control circuit with power factor correction function in another structure provided according to the second preferable embodiment of the disclosure.

FIG. 7 is a schematic circuit structure diagram of another constant current control circuit with power factor correction function provided according to a second preferable embodiment of the disclosure. Compared with the circuit structure shown in FIG. 6, an input signal of a harmonic compensating circuit 307 is a switching tube current sample signal of a switching tube S1, i.e., the signal sampled by a second sampling resistor Rx. The switching tube S1 and the second sampling resistor Rx, which are connected in series, are connected to a main circuit 301, and the harmonic compensating circuit 307 and the second sampling resistor Rx are connected in parallel. The input signal of the harmonic compensating circuit 307 is filtered by the harmonic compensating circuit 307, and the filtered signal may be output to a current sampling circuit 309 in a current control circuit 304 as an output signal Vxi.

The switching tube current sample signal is a periodic signal with a period the same as that of the input current of the power factor correction circuit, and each period includes a first time duration and a second time duration. In the first time duration, the output signal is a level signal; in the second time duration, the output signal decreases first from the level signal and then increases until returning to the level signal. In the first time duration, the input current is 0; in the second time duration, the input current is not 0.

It should be noted that, the harmonic compensating circuit 307 may further perform processes of filtering and DC blocking on the driving signal or the switching tube current sample signal, each of which is taken as the input signal, and the processed alternating current signal may be output to the current sampling circuit 309 in the current control circuit 304.

Figure 8:
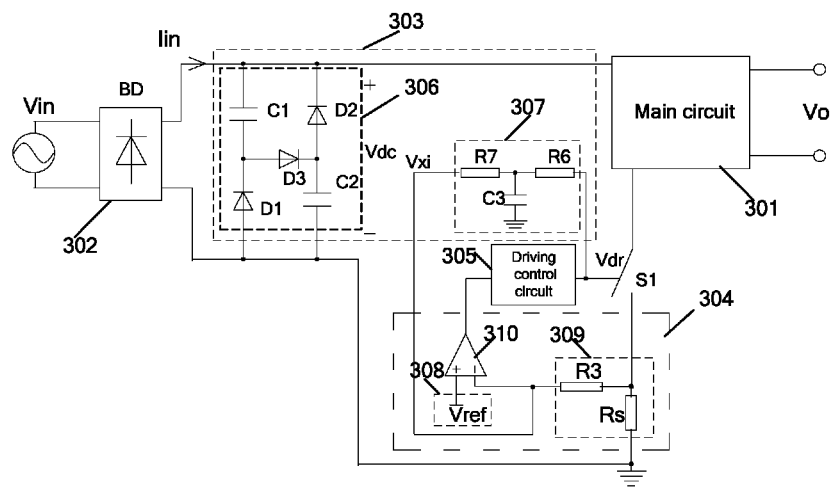
FIG. 8 is a detailed circuit diagram of an implementation provided according to the second preferable embodiment of the disclosure.

FIG. 8 is a detailed circuit diagram of an implementation provided according to the second preferable embodiment of the disclosure. A harmonic compensating circuit 307 includes a sixth resistor R6, a seventh resistor R7 and a third capacitor C3. One terminal of the sixth resistor R6 is connected to an output terminal of a driving control circuit 305, and another terminal of the sixth resistor R6 is grounded via the third capacitor C3. The intermediate node between the sixth resistor R6 and the third capacitor C3 is connected to an inverting input terminal of a comparing control circuit 310 via the seventh resistor R7, that is to say, after the sixth resistor R6 and the third capacitor C3 of the harmonic compensating circuit 307 filter a driving signal Vdr output by the driving control circuit, the filtered signal may be output to a current sampling circuit 309 of a current control circuit 304 via the seventh resistor R7. After an output signal Vxi of the harmonic compensating circuit and the signal on a first sampling resistor Rs are superposed by the seventh resistor R7 and a third resistor R3 of the current sampling circuit 309, the superposed signal, which may be taken as a current sample signal output by the current sampling circuit 309, may be output to the inverting input terminal of the comparing control circuit 310.

Figure 9:
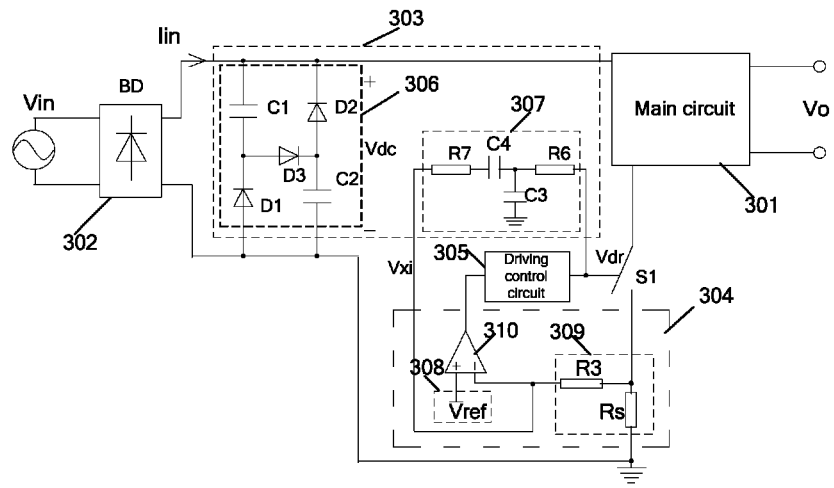
FIG. 9 is a detailed circuit diagram of another implementation provided according to the second preferable embodiment of the disclosure.

FIG. 9 is a detailed circuit diagram of another implementation provided according to the second preferable embodiment of the disclosure. Preferably, a harmonic compensating circuit 307 includes a sixth resistor R6, a third capacitor C3, a forth capacitor C4 and a seventh resistor R7. One terminal of the sixth resistor R6 is connected to an output terminal of the driving control circuit 305, and another terminal of the sixth resistor R6 is grounded via the third capacitor C3. The intermediate node between the sixth resistor R6 and the third capacitor C3 are connected to a third resistor R3 of a current sampling circuit 309 via the fourth capacitor C4 and the seventh resistor R7 which are connected in series. That is to say, after a driving signal Vdr output by the driving control circuit is filtered by the sixth resistor R6 and the third capacitor C3 of the harmonic compensating circuit 307, a DC blocking process is performed on the filtered signal by the fourth capacitor C4, and the processed signal may be output to the current sampling circuit 309 of a current control circuit 304 via the seventh resistor R7. After an output signal Vxi of the harmonic compensating circuit and the signal on the first sampling resistor Rs are superposed by the seventh resistor R7 and the third resistor R3 of the current sampling circuit 309, the superposed signal, which may be taken as a current sample signal output by the current sampling circuit 309, may be output to an inverting input terminal of the comparing control circuit 310.

Figure 10:
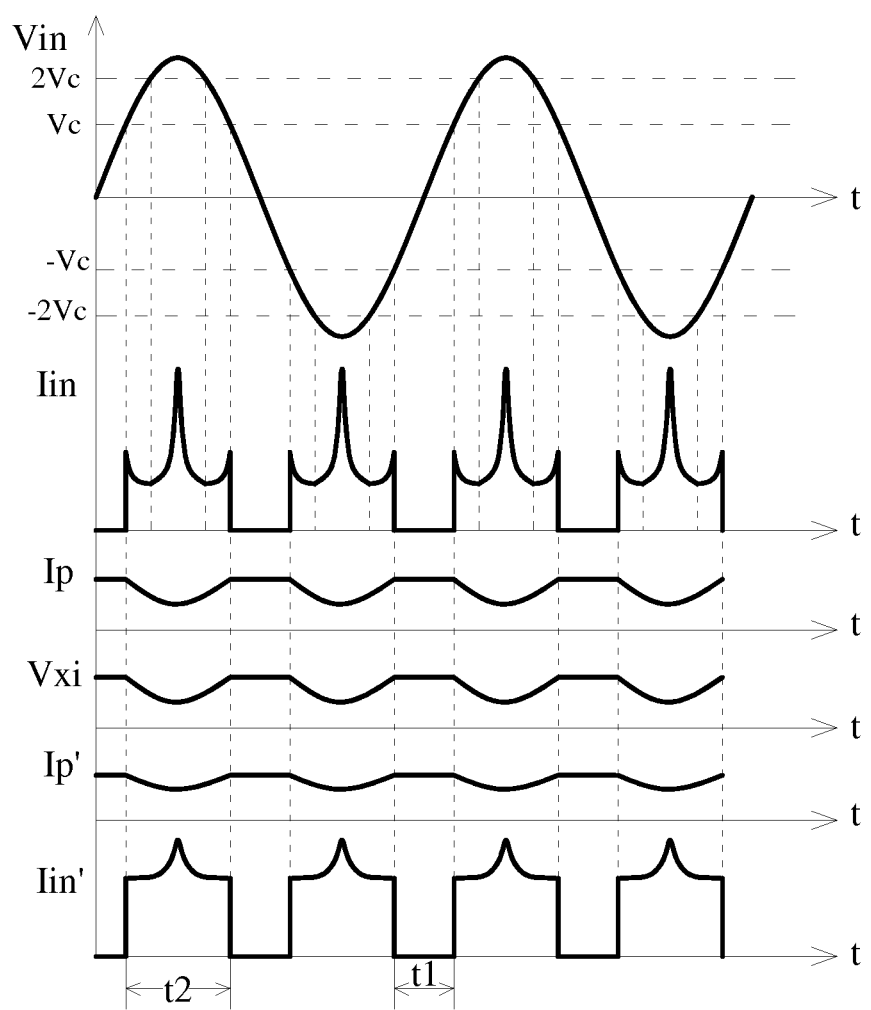
FIG. 10 is an oscillogram showing the working status of respective signals in the second preferable embodiment of the disclosure.

FIG. 10 is an oscillogram showing the working status of respective signals in the second preferable embodiment of the disclosure. The operational principle of the second preferable embodiment of the disclosure may be further described in more details in conjunction with the FIG. 10 in the following. In the second preferable embodiment, after the driving signal Vdr is filtered by the harmonic compensating circuit 307, the filtered signal may be taken as the Vxi, and the Vxi may be output to the current sampling circuit 309 of the current control circuit 304, hence the current on the first sampling resistor Rs of the current sampling circuit 309 may vary with the change of the Vxi and may be adjusted by the current control circuit 304 and the driving control circuit 305. The waveform of a current Ip' of a switching tube S1 is shown in FIG. 10.

In the first time duration t1, the output signal Vxi of the harmonic compensating circuit is a level signal; in the second time duration t2, the Vxi decreases first from the level signal in the time duration t1 and then increases until returning to the level signal in the time duration t1.

With reference to FIG. 10, the operational principle of the harmonic compensating circuit 307 in the second preferable embodiment is described in the following.

The average current of the switching tube S1 is Ip in a case that the harmonic compensating circuit is not added, while the average current of the switching tube S1 is Ip' in a case that the harmonic compensating circuit is added. That is to say, in the time duration t2, the value of the average current Ip' of the switching tube S1 in the case that the harmonic compensating circuit 307 is added is greater than the value of the average current Ip of the switching tube S1 in the case that the harmonic compensating circuit is not added, and the input current may change from Iin to Iin' due to the change of the current of the switching tube S1. That is because, in one hand in a case that the harmonic compensating circuit 307 is added, the average current Ip' of the switching tube S1 increases in the time duration t2, and then the input current Iin' may increase in turn; hence the Iin' is greater than the Iin in the time duration t2, and the recess in the waveform of Iin' is less than that of Iin, that is to say, the distortion of the output current is changed. In the other hand, since the output signal Vxi of the harmonic compensating circuit 307 is not 0 in the time duration t1, in other words, the value of the signal input to the inverting input terminal of the comparing control circuit 310 in the current control circuit 304 in the time duration t1 in a case that the harmonic compensating circuit 307 is added is greater than the value of the signal input to the inverting input terminal of the comparing control circuit 310 in the current control circuit 304 in the time duration t1 in a case that the harmonic compensating circuit 307 is not added. In the time duration t1, the current Ip' of the switching tube S1 is less than the current Ip, and in the time duration t1, the capacitor in the valley-fill PFC circuit 306 is in a state of discharging, and the discharging current of the capacitor in the time duration t1 is less (Ip' is less than Ip) in a case that the harmonic compensating circuit 307 is added; hence the peak of the input current in the time duration t1 depends on the charging charges on the capacitor. The discharging current is less in the time duration t1, hence the discharging charges may decrease and the charging charges in the time duration t2 may decrease in turn, and the peak of the input current Iin' may be less than the Iin as a result; therefore the distortion of the input current may be further improved and the power factor of the circuit may be enhanced.

Figure 11:
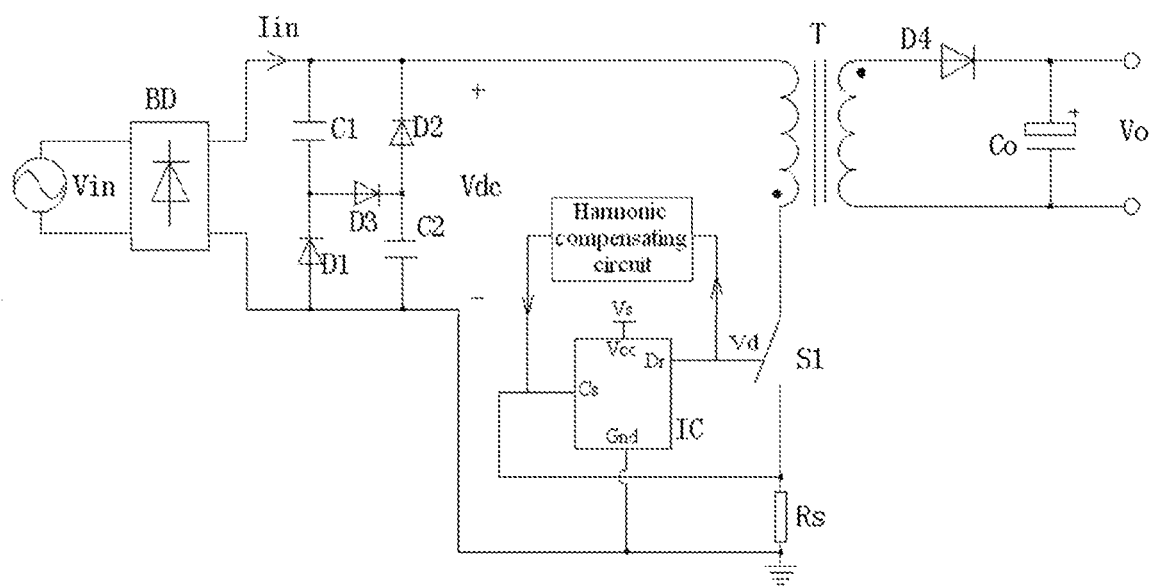
FIG. 11 is a schematic circuit diagram showing an IC in which a current control circuit and a driving control circuit according to the disclosure is integrated.

It should be noted that, the main circuit 301 according to this disclosure may be in any topology, for example, in an isolated topology or a non-isolated topology. In FIG. 11, a flyback circuit is taken as an example.

As shown in FIG. 11, a current control circuit 304 and a driving control circuit 305 are integrated in a chip IC, a pin Cs is an inverting input terminal of a comparing control circuit in a current control circuit, and a reference signal circuit of the current control circuit and the comparing control circuit are both integrated in the chip IC.

Accordingly, by adding a harmonic compensating circuit in the power factor correction circuit provided according to this disclosure, the distortion degree of input signal is improved, thereby further enhancing the power factor. The power factor correction circuit provided according to this disclosure is particularly adaptable for low-power constant-current control circuit, and has a power factor higher than that of the traditional valley-fill power factor correction circuit. Due to the harmonic compensating circuit, the input current may be improved, the distortion may be reduced, and the power factor of the circuit may be enhanced as a result; meanwhile the circuit is simple and the cost is low.

The disclosed embodiments are set forth only to illustrate the principle and effect of the disclosure, but not meant to limit the disclosure. Various modifications may be modified or changed by those skilled in the art without departing the spirit and scope of the disclosure. Accordingly, the scope of the disclosure is defined by the appended claims.

The invention claimed is:

1. A power factor correction circuit applicable in a constant-current control circuit, wherein the constant-current control circuit comprises a current control circuit and a driving control circuit, an output of the current control circuit is connected to the driving control circuit, an output of the driving control circuit is connected to a control terminal of a switching tube, the power factor correction circuit comprises a valley-fill PFC power factor correction circuit and a harmonic compensating circuit, an input signal of the harmonic compensating circuit is a driving signal output by the driving control circuit or is a switching tube current sample signal of the switching tube, and an output signal of the harmonic compensating circuit is output to the current control circuit, and the output signal of the harmonic compensating circuit is a periodic signal with a period same as that of an input current of the power factor correction circuit, each period comprises a first time duration in which the output signal is a level signal and a second time duration in which the output signal increases from the level signal and then decreases until returning to the level signal or the output signal decreases from the level signal and then increase until returning to the level signal, wherein the first time duration is a time duration in which the input current is 0, and the second time duration is a time duration in which the input current is not 0.

2. The power factor correction circuit according to claim 1, wherein in a case that the input signal of the harmonic compensating circuit is the driving signal output by the driving control circuit, the current control circuit comprises a reference signal circuit, a comparing control circuit and a current sample circuit, the harmonic compensating circuit is adapted to filter the input driving signal, and to output the filtered signal as the output signal to the current sampling circuit in the current control circuit, such that a sample signal input to the comparing control circuit varies with the output signal of the harmonic compensating circuit, wherein the comparing control circuit is adapted to output a control signal to the driving control circuit after comparing the sample signal and a reference signal which is output by the reference signal circuit, and the driving control circuit is adapted to control the switching tube such that a current of the switching tube varies with the output signal of the harmonic compensating circuit.

3. The power factor correction circuit according to claim 2, wherein the reference signal circuit comprises a reference voltage connected to a non-inverting input terminal of the comparing control circuit; wherein the current sampling circuit comprises a first sampling resistor and a third resistor, one terminal of the first sampling resistor is grounded, and another terminal of the first sampling resistor is connected to the switching tube of a main circuit and is further connected to an inverting input terminal of the comparing control circuit via the third resistor, and an output terminal of the harmonic compensating circuit is connected to the inverting input terminal of the comparing control circuit; wherein an output terminal of the comparing control circuit is connected to the driving control circuit, and the comparing control circuit outputs the control signal to the driving control circuit after comparing the reference signal with a current sample signal.

4. The power factor correction circuit according to claim 3, wherein the harmonic compensating circuit comprises a sixth resistor, a seventh resistor and a third capacitor, one terminal of the sixth resistor is connected to an output terminal of the driving control circuit, and another terminal of the sixth resistor is grounded via the third capacitor, wherein an intermediate node between the sixth resistor and the third capacitor is connected to the inverting input terminal of the comparing control circuit via the seventh resistor.

5. The power factor correction circuit according to claim 4, wherein the harmonic compensating circuit further comprises a fourth capacitor, wherein the intermediate node between the sixth resistor and the third capacitor is connected to the inverting input terminal of the comparing control circuit via the seventh resistor and the fourth capacitor which are connected in series, and the input signal undergoes direct-current blocking before being output to the current sample circuit.

6. The power factor correction circuit according to claim 1, wherein in a case that the input signal of the harmonic compensating circuit is the switching tube current sample signal of the switching tube, the current control circuit comprises a reference signal circuit, a comparing control circuit and a current sampling circuit, the harmonic compensating circuit is adapted to filter the switching tube current sample signal, and to output the filtered signal as an output signal to the current sampling circuit in the current control circuit, such that a sample signal input to the comparing control circuit varies with the output signal of the harmonic compensating circuit, wherein the comparing control circuit is adapted to output a control signal to the driving control circuit after comparing the sample signal with a reference signal output by the reference signal circuit, and the driving control circuit is adapted to control the switching tube such that a current of the switching tube varies with the output signal of the harmonic compensating circuit.

7. The power factor correction circuit according to claim 1, wherein the current control circuit comprises a reference signal circuit, a comparing control circuit and a current sampling circuit, the harmonic compensating circuit is adapted to filter the switching tube current sample signal, process the filtered signal by direct-current blocking and output the processed signal to the current sampling circuit in the current control circuit, such that a sample signal output to the comparing control circuit varies with the output signal of the harmonic compensating circuit, wherein the comparing control circuit is adapted to output a control signal to the driving control circuit after comparing the sample signal with a reference signal output by the reference signal circuit, and the driving control circuit is adapted to control the switching tube such that a current of the switching tube varies with the output signal of the harmonic compensating circuit.

8. A constant-current control circuit with power factor correction function, wherein the constant-current control circuit with power factor correction function is adapted to drive a LED load, wherein the constant-current control circuit comprises a main circuit, a rectifying circuit, a current control circuit and a driving control circuit, the current control circuit is connected to a switching tube of the main circuit, the current control circuit comprises a reference signal circuit, a current sampling circuit and a comparing control circuit, the driving control circuit is connected to a control terminal of the switching tube, and the constant-current control circuit further comprises a power factor correction circuit, wherein the power factor correction circuit comprises a valley-fill PFC power factor correction circuit and a harmonic compensating circuit, an input signal of the harmonic compensating circuit is a driving signal output by the driving control circuit or is a switching tube current sample signal of the switching tube, and an output signal of the harmonic compensating circuit is output to the current control circuit, and the output signal of the harmonic compensating circuit is a periodic signal with a period same as that of an input current of the power factor correction circuit, each period comprises a first time duration in which the output signal is a level signal and a second time duration in which the output signal increases from the level signal and then decreases until returning to the level signal or the output signal decreases from the level signal and then increases until returning to the level signal, wherein the first time duration is a time duration in which the input current is 0, and the second time duration is a time duration in which the input current is not 0.

* * * * *